US012340555B1

United States Patent
Lv et al.

(10) Patent No.: US 12,340,555 B1
(45) Date of Patent: Jun. 24, 2025

(54) AUTOMATIC COLOR MATCHING CONFIGURATION METHOD AND DEVICE FOR MARBLE

(71) Applicant: CHINA CONSTRUCTION ENGINEERING DESIGN & RESEARCH INSTITUTE CO., LTD, Beijing (CN)

(72) Inventors: Feng Lv, Beijing (CN); Ting Li, Beijing (CN); Zhixing Wang, Beijing (CN); Shengjie Liu, Beijing (CN)

(73) Assignee: CHINA CONSTRUCTION ENGINEERING DESIGN & RESEARCH INSTITUTE CO., LTD, Beijing (CN)

( * ) Notice: Subject to any disclaimer, the term of this patent is extended or adjusted under 35 U.S.C. 154(b) by 0 days.

(21) Appl. No.: 19/017,233

(22) Filed: Jan. 10, 2025

Related U.S. Application Data

(63) Continuation of application No. PCT/CN2024/142429, filed on Dec. 25, 2024.

(30) Foreign Application Priority Data

May 15, 2024 (CN) .......................... 202410604786.1

(51) Int. Cl.
| | |
|---|---|
| G06V 10/56 | (2022.01) |
| G06V 10/44 | (2022.01) |
| G06V 10/75 | (2022.01) |
| H04N 23/71 | (2023.01) |
| H04N 23/74 | (2023.01) |

(52) U.S. Cl.
CPC .............. *G06V 10/56* (2022.01); *G06V 10/44* (2022.01); *G06V 10/759* (2022.01); *H04N 23/71* (2023.01); *H04N 23/74* (2023.01)

(58) Field of Classification Search
CPC ...... G06V 10/56; G06V 10/44; G06V 10/759; H04N 23/71; H04N 23/74
USPC ........................................................ 382/162
See application file for complete search history.

(56) References Cited

U.S. PATENT DOCUMENTS

| | | | |
|---|---|---|---|
| 2016/0200621 A1* | 7/2016 | N'Gom ................. | B23K 26/53 65/355 |
| 2017/0261438 A1 | 9/2017 | Okcuoglu et al. | |
| 2019/0340732 A1* | 11/2019 | Qin ........................ | G06V 10/32 |

(Continued)

FOREIGN PATENT DOCUMENTS

| | | |
|---|---|---|
| CN | 109523600 A | 3/2019 |
| CN | 115126275 A | 9/2022 |

*Primary Examiner* — Ali Bayat
(74) *Attorney, Agent, or Firm* — George D. Morgan

(57) ABSTRACT

Disclosed is an automatic color matching configuration method and device for marble, where the method includes the following steps: obtaining a to-be-repaired image of to-be-repaired marble for image recognition to determine a to-be-repaired contour in the to-be-repaired image; extending outward a preset distance along the to-be-repaired contour to generate a reference contour, and determining an area between the reference contour and the to-be-repaired contour as a reference area; filling a base coating into a to-be-repaired area in the to-be-repaired contour to form an initial base coat; determining a base pixel value based on a color ratio of the reference area, and performing base color matching on the initial base coat based on the base pixel value to obtain a current base coat.

10 Claims, 3 Drawing Sheets

(56) References Cited

U.S. PATENT DOCUMENTS

| | | | |
|---|---|---|---|
| 2020/0150052 A1* | 5/2020 | Lee | G01N 21/8903 |
| 2020/0272866 A1* | 8/2020 | Xu | G06F 18/211 |
| 2021/0248428 A1* | 8/2021 | Sharma | G06F 18/214 |
| 2023/0103385 A1* | 4/2023 | Zhang | G06T 3/4038 |
| | | | 382/100 |
| 2024/0369688 A1* | 11/2024 | Haag | G01S 17/89 |

* cited by examiner

AUTOMATIC COLOR MATCHING CONFIGURATION METHOD AND DEVICE FOR MARBLE

CROSS-REFERENCE TO RELATED APPLICATIONS

The application claims priority to Chinese patent application No. 2024106047861, filed on May 15, 2024, the entire contents of which are incorporated herein by reference.

TECHNICAL FIELD

The present invention relates to data processing technology, and in particular, to an automatic color matching configuration method and device for marble.

BACKGROUND

Marble has high compressive strength and good physical and chemical properties, and is easy to process. With the development of the economy, its application scope continues to expand and its consumption is increasing, making it play an important role in people's lives. Especially in the past decade, large-scale mining, industrial processing, and international trade have led to large quantities of decorative slabs entering the building decoration industry, not only for luxury public buildings but also for home decoration. However, defects such as dents or cracks may also occur due to daily use and need to be repaired in time.

During the research, the inventor found that after polishing and repairing marble with defects such as dents or cracks, it was very important to conduct precise color matching on the surface of the marble repair area to ensure the overall repair effect of the marble. Existing color matching technology in the prior art may sometimes lead to a quite different color from the original one of the marble, or manual color matching is required, which causes waste of manpower.

SUMMARY

In view of the foregoing problems, the present invention is proposed to provide an automatic color matching method and device for marble that overcomes or at least partially solves the foregoing problems.

According to one aspect of the present invention, an automatic color matching configuration method for marble is provided, including the following steps:
  obtaining a to-be-repaired image of to-be-repaired marble, and performing image recognition based on the to-be-repaired image to determine a to-be-repaired contour in the to-be-repaired image;
  extending outward a preset distance along the to-be-repaired contour in the to-be-repaired image to generate a reference contour surrounding the to-be-repaired contour, and determining an area between the reference contour and the to-be-repaired contour as a reference area;
  filling a base coating into a to-be-repaired area in the to-be-repaired contour to form an initial base coat;
  determining a base pixel value based on a color ratio of the reference area, and performing base color matching on the initial base coat based on the base pixel value to obtain a current base coat;
  performing regional color matching on the current base coat based on pattern distribution of the reference area to obtain a repaired area, and determining the to-be-repaired marble as repaired marble; and
  obtaining a repaired image of the repaired marble, and generating historical record entries based on the repaired image and the to-be-repaired image.

Optionally, in the method according to the present invention, the step of obtaining a to-be-repaired image of to-be-repaired marble, and performing image recognition based on the to-be-repaired image to determine a to-be-repaired contour in the to-be-repaired image includes:
  obtaining brightness of ambient light, and comparing the brightness with preset brightness;
  when the brightness is less than or equal to the preset brightness, calling a preset lighting plug-in, and illuminating the to-be-repaired marble based on the preset lighting plug-in;
  calling a preset camera plug-in, and collecting images of the to-be-repaired marble based on the preset camera plug-in to obtain the to-be-repaired image of the to-be-repaired marble; and
  inputting the to-be-repaired image to a pre-trained image recognition model to determine the to-be-repaired contour in the to-be-repaired image.

Optionally, in the method according to the present invention, the step of extending outward a preset distance along the to-be-repaired contour in the to-be-repaired image to generate a reference contour surrounding the to-be-repaired contour, and determining an area between the reference contour and the to-be-repaired contour as a reference area includes:
  determining a circumscribed circle having a circumscribed relationship with the to-be-repaired contour, and determining a radius of the circumscribed circle as the preset distance;
  extending outward the preset distance along the to-be-repaired contour to generate an initial contour surrounding the to-be-repaired contour, and determining whether contour lines of the initial contour are wholly located inside a frame of the to-be-repaired image; and
  when the contour lines of the initial contour are at least partially located outside the to-be-repaired image, updating the initial contour based on the frame of the to-be-repaired image to obtain the reference contour located inside the frame, and determining the area between the reference contour and the to-be-repaired contour as the reference area.

Optionally, in the method according to the present invention, the step of updating the initial contour based on the frame of the to-be-repaired image to obtain the reference contour located inside the frame includes:
  when the contour lines of the initial contour are wholly located outside the to-be-repaired image, determining the frame of the to-be-repaired image as the reference contour; or
  when the contour lines of the initial contour are partially located outside the to-be-repaired image, determining independent segments in the partial contour lines;
  obtaining a first intersection point and a second intersection point between each of the independent segments and the frame, and dividing the frame based on the first intersection point and the second intersection point to obtain updated segments corresponding to the independent segments; and updating the initial contour based on the updated segments corresponding to the independent segment to obtain the reference contour located inside the frame.

Optionally, in the method according to the present invention, the step of determining a base pixel value based on a color ratio of the reference area, and performing base color matching on the initial base coat based on the base pixel value to obtain a current base coat includes:

obtaining reference pixel points located inside the reference area, and determining reference pixel values corresponding to the reference pixel points;

calling a plurality of preset pixel value intervals, and dividing the reference pixel points corresponding to the reference pixel values within the same preset pixel value interval into the same group to obtain reference pixel groups;

calculating the number of pixels of the reference pixel points in the reference pixel groups to obtain calculated numbers corresponding to the reference pixel groups;

determining the one with the largest calculated number among the reference pixel groups, and determining the preset pixel value interval corresponding thereto as a base interval;

obtaining a maximum endpoint value and a minimum endpoint value in the base interval, and calculating a mean based on the maximum endpoint value and the minimum endpoint value to obtain the base pixel value; and performing the base color matching on the initial base coat based on the base pixel value to obtain the current base coat.

Optionally, in the method according to the present invention, the step of performing regional color matching on the current base coat based on pattern distribution of the reference area to obtain a repaired area includes:

obtaining pattern types located inside the reference area, where different pattern types correspond to different pattern elements;

when at least two pattern elements of the same pattern type extend to connect with different positions of the to-be-repaired contour, extending the at least two pattern elements in a direction toward the to-be-repaired area respectively to form interconnected transition areas; and performing the regional color matching on the transition areas based on the pattern types to obtain the repaired area.

Optionally, in the method according to the present invention, the method further includes:

determining pattern types far away from the to-be-repaired contour, and determining the number of reference elements of the pattern elements corresponding to the pattern types in the reference area;

obtaining an area ratio between the reference area and the to-be-repaired area, and determining the number of repaired elements corresponding to the number of reference elements based on the area ratio; and generating pattern elements corresponding to the number of repaired elements in the to-be-repaired area in a random manner, and performing the regional color matching on the pattern elements based on the pattern types.

Optionally, in the method according to the present invention, the step of obtaining a repaired image of the repaired marble, and generating historical record entries based on the repaired image and the to-be-repaired image includes:

calling a historical repair form, where the historical repair form includes blank record entries arranged in order, and each of the blank record entries includes a time slot and an image slot;

selecting one of the blank record entries in order, and determining the one as a to-be-filled record entry;

calling a preset camera plug-in, and collecting images of the repaired marble based on the preset camera plug-in to obtain the repaired image of the repaired marble and a collection time; and filling the collection time into the time slot, and filling the repaired image and the to-be-repaired image into the image slot to obtain the historical record entries.

Optionally, in the method according to the present invention, the step of filling the repaired image and the to-be-repaired image into the image slot includes:

including a preset blank image layer in the image slot, where the preset blank image layer includes a first image area and a second image area;

filling the first image area with the repaired image, and generating in the first image area a first marking frame for selecting the repaired area in the repaired image;

filling the second image area with the to-be-repaired image, and generating in the second image area a second marking frame for selecting the to-be-repaired area in the to-be-repaired image; and generating a marking frame connection line, where one end of the marking frame connection line is connected to an outline of the first marking frame and the other end thereof is connected to an outline of the second marking frame.

According to another aspect of the present invention, an automatic color matching configuration device for marble is provided, including:

a recognition module, configured to obtain a to-be-repaired image of to-be-repaired marble, and perform image recognition based on the to-be-repaired image to determine a to-be-repaired contour in the to-be-repaired image;

a contour generation module, configured to extend outward a preset distance along the to-be-repaired contour in the to-be-repaired image to generate a reference contour surrounding the to-be-repaired contour, and determine an area between the reference contour and the to-be-repaired contour as a reference area;

a filling module, configured to fill a base coating into a to-be-repaired area in the to-be-repaired contour to form an initial base coat;

a base color matching module, configured to determine a base pixel value based on a color ratio of the reference area, and perform base color matching on the initial base coat based on the base pixel value to obtain a current base coat;

a regional color matching module, configured to perform regional color matching on the current base coat based on pattern distribution of the reference area to obtain a repaired area, and determine the to-be-repaired marble as repaired marble; and a form creation module, configured to obtain a repaired image of the repaired marble, and create a historical repair form based on the repaired image and the to-be-repaired image.

According to the solution of the present invention, a server can implement the following steps in order: obtain a to-be-repaired image of to-be-repaired marble and perform image recognition based on the to-be-repaired image to determine a to-be-repaired contour in the to-be-repaired image; extend outward a preset distance along the to-be-repaired contour in the to-be-repaired image to generate a reference contour surrounding the to-be-repaired contour, and determine an area between the reference contour and the to-be-repaired contour as a reference area; fill a base coating into a to-be-repaired area to form an initial base coat; determine a base pixel value based on a color ratio of the reference area, and perform base color matching on the initial base coat based on the base pixel value to obtain a current base coat; perform regional color matching on the current base coat based on pattern distribution of the reference area to obtain a repaired area, and determine the to-be-repaired marble as repaired marble; and obtain a repaired image of the repaired marble, and generate historical record entries based on the repaired image and the to-be-repaired image. The present invention can perform color matching on the base coat based on the color ratio of the reference area in an objective manner, thereby greatly improving the marble repair effect and efficiency.

DETAILED DESCRIPTION OF THE EMBODIMENTS

Exemplary embodiments of the present disclosure will be described below with reference to the accompanying drawings. Although exemplary embodiments of the present disclosure are shown in the accompanying drawings, it should be appreciated that the disclosure may be implemented in various forms and should not be limited by the disclosed embodiments herein. Rather, these embodiments are provided to enable a more thorough understanding of the present disclosure and to fully convey the scope of the present disclosure to those skilled in the art.

Marble has high compressive strength and good physical and chemical properties, and is easy to process. With the development of the economy, its application scope continues to expand and its consumption is increasing, making it play an important role in people's lives. Especially in the past decade, large-scale mining, industrial processing, and international trade have led to large quantities of decorative slabs entering the building decoration industry, not only for luxury public buildings but also for home decoration. However, defects such as dents or cracks may also occur due to daily use and need to be repaired in time.

During the research, the inventor found that after polishing and repairing marble with defects such as dents or cracks, it was very important to conduct precise color matching on the surface of the marble repair area to ensure the overall repair effect of the marble. Existing color matching technology in the prior art may sometimes lead to a quite different color from the original one of the marble, or manual color matching is required, which causes waste of manpower.

In order to solve the above problems in the prior art, the inventor proposes technical solutions of the present invention. In one embodiment of the present invention, an automatic color matching configuration method for marble is provided, and the method can be executed in a computing device.

Figure 1:
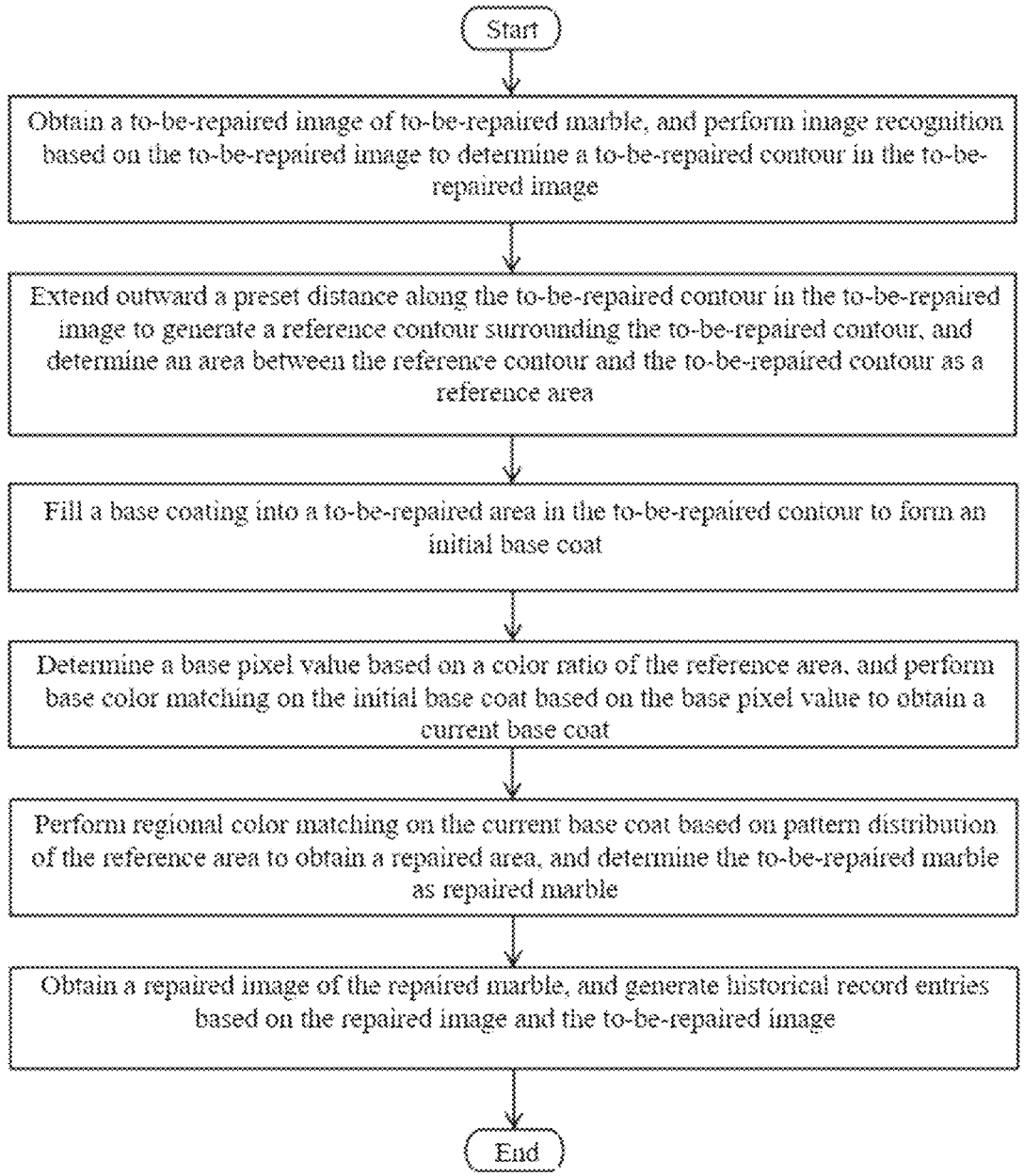
FIG. 1 is a flow chart of an automatic color matching configuration method for marble according to one embodiment of the present invention.

FIG. 1 is a flow chart of a method 100 according to one embodiment of the invention, and the method is suitable for execution in a computing device.

As shown in FIG. 1, the method 100 is intended to implement an automatic color matching configuration method for marble, starting from the step 102. The step 102 includes the following steps:

obtaining a to-be-repaired image of to-be-repaired marble, and performing image recognition based on the to-be-repaired image to determine a to-be-repaired contour in the to-be-repaired image.

For example, in the embodiment, the machine side can be understood as a robot with an infrared scanning function, image collection function, and mobile function, and the server will control the machine side to collect images of the to-be-repaired marble, thereby obtaining an image of the to-be-repaired marble, that is, the to-be-repaired image, and performing image recognition on the to-be-repaired image. After recognition, a contour of the to-be-repaired area in the to-be-repaired image can be determined, that is, the to-be-repaired contour.

Figure 2:
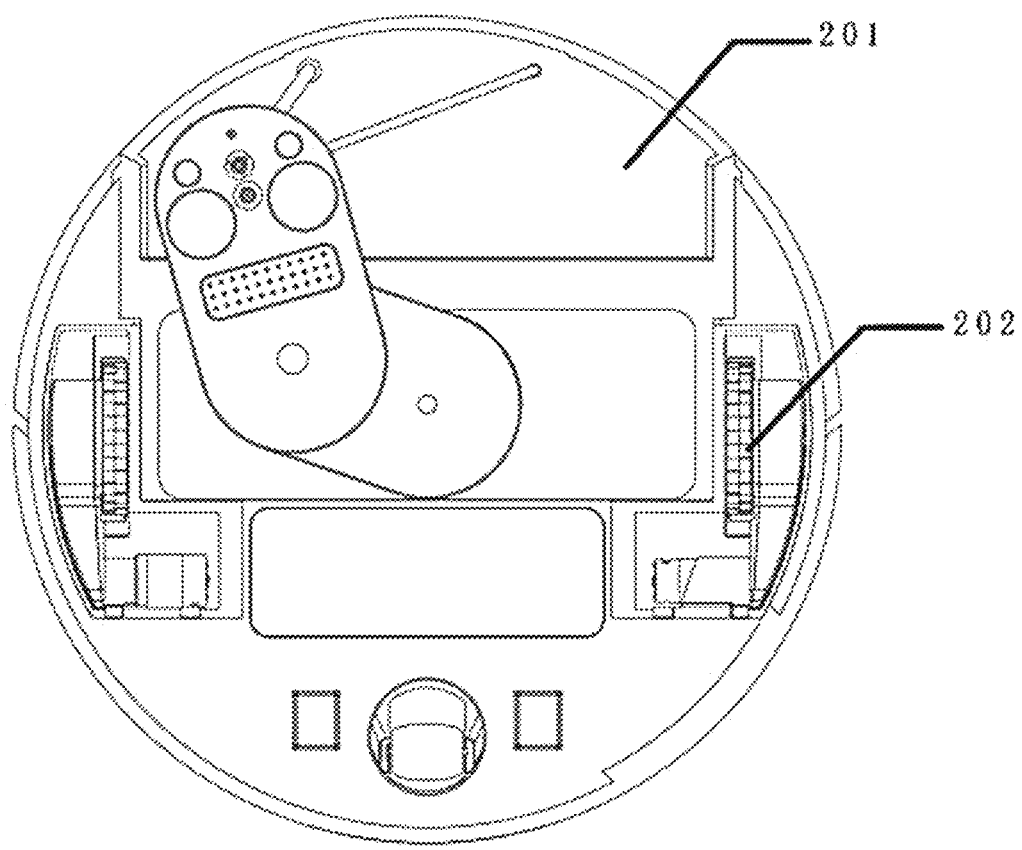
FIG. 2 is a schematic structural diagram of a machine side in the embodiment.

FIG. 2 illustrates a schematic structural diagram of the machine side in the embodiment. As shown in FIG. 2, the machine side includes a machine body 201 and a movable pulley 202, where the movable pulley 202 can drive the machine body 201 to move so as to complete corresponding color matching work.

Furthermore, the step of obtaining a to-be-repaired image of to-be-repaired marble, and performing image recognition based on the to-be-repaired image to determine a to-be-repaired contour in the to-be-repaired image further includes the following steps:

obtaining brightness of ambient light, and comparing the brightness with preset brightness;

when the brightness is less than or equal to the preset brightness, calling a preset lighting plug-in, and illuminating the to-be-repaired marble based on the preset lighting plug-in;

calling a preset camera plug-in, and collecting images of the to-be-repaired marble based on the preset camera plug-in to obtain the to-be-repaired image of the to-be-repaired marble; and inputting the to-be-repaired image to a pre-trained image recognition model to determine the to-be-repaired contour in the to-be-repaired image.

For example, in the embodiment, when the server controls the machine side to obtain the to-be-repaired image of the to-be-repaired marble, the server first controls the machine side to obtain brightness of current ambient light and compares the brightness with preset brightness, where the preset brightness can be the lowest brightness that the ambient light needs to reach during image collection.

Furthermore, when the brightness is greater than the preset brightness, it means that the brightness of the current ambient light meets image collection conditions, that is, when the machine side collects images under the brightness of the current ambient light, it can collect clear images of the to-be-repaired marble; when the brightness is less than or equal to the preset brightness, the server will control the machine side to call the preset lighting plug-in to illuminate the to-be-repaired marble through the preset lighting plug-in, so as to achieve standard brightness during image collection; then, the server will further control the machine side to call the preset camera plug-in to collect images of the to-be-repaired marble, and obtain the to-be-repaired image of the to-be-repaired marble after image collection. The preset lighting plug-in and the preset camera plug-in can be preset on the machine side in advance. The server will call the preset lighting plug-in or the preset camera plug-in under corresponding usage conditions to achieve lighting or photography purposes.

After obtaining the to-be-repaired image of the to-be-repaired marble, the server will input the to-be-repaired image into the pre-trained image recognition model to determine the to-be-repaired contour in the to-be-repaired image.

The step S104 further includes the following steps:
extending outward a preset distance along the to-be-repaired contour in the to-be-repaired image to generate a reference contour surrounding the to-be-repaired contour, and determining an area between the reference contour and the to-be-repaired contour as a reference area.

For example, in the embodiment, after obtaining the to-be-repaired contour, the server will extend outward a preset distance along the to-be-repaired contour in the to-be-repaired image to generate a contour surrounding the to-be-repaired contour, namely a reference contour, and determines an area between the to-be-repaired contour and the reference contour as a reference area. The reference area has no defective part, that is, it is an intact area, so it can be used as a reference.

Furthermore, the step of "extending outward a preset distance along the to-be-repaired contour in the to-be-repaired image to generate a reference contour surrounding the to-be-repaired contour, and determining an area between the reference contour and the to-be-repaired contour as a reference area further" includes the following steps:
determining a circumscribed circle having a circumscribed relationship with the to-be-repaired contour, and determining a radius of the circumscribed circle as the preset distance;
extending outward the preset distance along the to-be-repaired contour to generate an initial contour surrounding the to-be-repaired contour, and determining whether contour lines of the initial contour are wholly located inside a frame of the to-be-repaired image; and
when the contour lines of the initial contour are at least partially located outside the to-be-repaired image, updating the initial contour based on the frame of the to-be-repaired image to obtain the reference contour located inside the frame, and determining the area between the reference contour and the to-be-repaired contour as the reference area.

Furthermore, the step of updating the initial contour based on the frame of the to-be-repaired image to obtain the reference contour located inside the frame further includes the following steps:
when the contour lines of the initial contour are wholly located outside the to-be-repaired image, determining the frame of the to-be-repaired image as the reference contour; or
when the contour lines of the initial contour are partially located outside the to-be-repaired image, determining independent segments in the partial contour lines;
obtaining a first intersection point and a second intersection point between each of the independent segments and the frame, and dividing the frame based on the first intersection point and the second intersection point to obtain updated segments corresponding to the independent segments; and
updating the initial contour based on the updated segments corresponding to the independent segment to obtain the reference contour located inside the frame.

For example, in the embodiment, the server extends outward the preset distance along the to-be-repaired contour to generate an initial contour surrounding the to-be-repaired contour. The preset distance is calculated as follows: the server generates a circumscribed circle that has a circumscribed relationship with the to-be-repaired contour, and determines a radius of the circumscribed circle as the preset distance. This calculation method can quickly obtain the preset distance without needing the administrator side to set additional values, and can also ensure that the reference area has a more appropriate width.

After determining the initial contour, the server will further determine whether the contour lines of the generated initial contour are wholly located inside the frame of the to-be-repaired image. If the contour lines of the initial contour are partially located outside the to-be-repaired image, the server will update the initial contour based on the frame of the to-be-repaired image to obtain a contour wholly located inside the frame, namely the reference contour, and determine the area between the reference contour and the to-be-repaired contour as the reference area.

It should be noted that there are generally three different positional relationships between the initial contour and the frame of the to-be-repaired image, for example, a first positional relationship may be that the contour lines of the initial contour are wholly located inside the frame of the to-be-repaired image; a second positional relationship may be that the contour lines of the initial contour are partially located outside the frame of the to-be-repaired image; and a third positional relationship may be that the contour lines of the initial contour are wholly located outside the frame of the to-be-repaired image;
among these three positional relationships, the corresponding initial contour needs to be updated for the second and third ones as follows:
for the second positional relationship, since the contour lines of the initial contour are partially located outside the frame of the to-be-repaired image, first, independent segments located outside the frame of the to-be-repaired image can be obtained, where the independent segments can be understood as contour lines that are isolated from other contour lines located outside the frame of the to-be-repaired image, that is, each independent segment will have two intersection points with the frame of the to-be-repaired image, namely a first intersection point and a second intersection point respectively; then, the frame can be divided based on the first intersection point and the second intersection point to obtain updated segments corresponding to the independent segments; and finally, the initial contour is updated based on the updated segments to obtain the corresponding reference contour located inside the frame to complete an update of the initial contour; and
for the third positional relationship, since the initial contour is wholly located outside the frame of the to-be-repaired image (that is, the initial contour is surrounded by the frame of the to-be-repaired image), and the to-be-repaired image is obtained for the to-be-repaired marble, the frame of the to-be-repaired image can be directly determined as the reference contour to complete the update of the initial contour.

By updating the initial contour based on the positional relationship between the initial contour and the frame of the to-be-repaired image, and obtaining the corresponding reference contour, it can be ensured that the corresponding reference contour can be located inside the frame of the to-be-repaired image, that is, it can be ensured that the area located inside the reference contour corresponds to the area of the to-be-repaired marble, thereby ensuring the corresponding reference and improving the corresponding accuracy.

The step S106 further includes the following steps:
filling a base coating into a to-be-repaired area in the to-be-repaired contour to form an initial base coat.

For example, in the embodiment, since under normal circumstances, marble has a base color mixed with patterns of other colors on the surface thereof, for example, a piece of marble looks entirely white and there are patterns of other colors on the surface thereof to increase the richness of the marble color, when the server controls the machine side to repair the to-be-repaired marble, it will first fill a base coating into the base of the to-be-repaired area to form an initial base coat.

The step S108 further includes the following steps:
determining a base pixel value based on a color ratio of the reference area, and performing base color matching on the initial base coat based on the base pixel value to obtain a current base coat.

For example, in the embodiment, since under normal circumstances, the base color accounts for a larger proportion in the color distribution of a piece of marble while the patterns on the surface account for a smaller proportion, the server will first obtain a color ratio of the reference area and determine a base pixel value based on the color ratio, thereby performing color matching on the initial base coat based on the base pixel value to obtain a current base coat.

Furthermore, the step of "determining a base pixel value based on a color ratio of the reference area, and performing base color matching on the initial base coat based on the base pixel value to obtain a current base coat" further includes the following steps:
obtaining reference pixel points located inside the reference area, and determining reference pixel values corresponding to the reference pixel points;
calling a plurality of preset pixel value intervals, and dividing the reference pixel points corresponding to the reference pixel values within the same preset pixel value interval into the same group to obtain reference pixel groups;
calculating the number of pixels of the reference pixel points in the reference pixel groups to obtain calculated numbers corresponding to the reference pixel groups;
determining the one with the largest calculated number among the reference pixel groups, and determining the preset pixel value interval corresponding thereto as a base interval;
obtaining a maximum endpoint value and a minimum endpoint value in the base interval, and calculating a mean based on the maximum endpoint value and the minimum endpoint value to obtain the base pixel value; and
performing the base color matching on the initial base coat based on the base pixel value to obtain the current base coat.

For example, in the embodiment, the server can determine the color ratio of the reference area. First, the server will obtain reference pixel points located inside the reference area, and determine reference pixel values corresponding to the reference pixel points. Then, the server will call a plurality of preset pixel value intervals, and divide the reference pixel values according to the preset pixel value intervals by dividing the reference pixel values within a preset pixel value interval into a group, that is, the reference pixel points corresponding to the reference pixel values within the same preset pixel value interval into the same group to obtain reference pixel groups, and the preset pixel value intervals may be preset by the administrator side according to actual conditions.

After obtaining the reference pixel groups, the server will calculate the number of pixels of the reference pixel points in the reference pixel groups to obtain calculated numbers corresponding to the reference pixel groups. Then, the one with the largest calculated number among the reference pixel groups is determined. Since the largest calculated number also means that the corresponding color accounts for the largest proportion, the preset pixel value interval corresponding thereto is determined as a base interval. Additionally, since the color of marble may change slightly due to reasons such as use for a long time (for example, the color is changed due to oxidation with time), the server will obtain a maximum endpoint value and a minimum endpoint value in the base interval, and calculate a mean based on the maximum endpoint value and the minimum endpoint value to obtain the base pixel value. The base pixel value obtained in this way is relatively accurate, and then base color matching is performed on the initial base coat based on the base pixel value to obtain a current base coat, which can improve the corresponding repair effect.

The step S110 further includes the following steps:
performing regional color matching on the current base coat based on pattern distribution of the reference area to obtain a repaired area, and determining the to-be-repaired marble as repaired marble.

For example, in the embodiment, after obtaining the current base coat, the server will perform regional color matching on the current base coat based on pattern distribution of the reference area to obtain a repaired area, and determine the to-be-repaired marble as repaired marble.

Furthermore, the step of performing regional color matching on the current base coat based on pattern distribution of the reference area to obtain a repaired area further includes the following steps:
obtaining pattern types located inside the reference area, where different pattern types correspond to different pattern elements;
when at least two pattern elements of the same pattern type extend to connect with different positions of the to-be-repaired contour, extending the at least two pattern elements in a direction toward the to-be-repaired area respectively to form interconnected transition areas; and
performing the regional color matching on the transition areas based on the pattern types to obtain the repaired area.

For example, in the embodiment, the server will obtain pattern types in the reference area, where different pattern types correspond to different pattern elements, for example, the pattern element of a first pattern type is a flower, and the pattern element of a second pattern type is the sun. When two sun patterns are respectively connected to both sides of the to-be-repaired contour, the area between the two sun patterns can be connected in the to-be-repaired area to form a transition area; when three sun patterns are respectively connected to both sides of the to-be-repaired contour, for example, one sun pattern is connected to the left side of the to-be-repaired contour and two sun patterns are connected to the right side thereof, the sun pattern on the left side is connected to the two sun patterns on the right respectively in the to-be-repaired area to form two transition areas. That is, when at least two pattern elements of the same pattern type are respectively extended to connect with different positions of the to-be-repaired contour, the at least two pattern elements are respectively extended in a direction toward the to-be-repaired area to form a transition area connected to each other. Then, regional color matching is performed on the transition areas based on the pattern types to obtain the repaired area.

Furthermore, the method described above further includes the following steps:
  determining pattern types far away from the to-be-repaired contour, and determining the number of reference elements of the pattern elements corresponding to the pattern types in the reference area;
  obtaining an area ratio between the reference area and the to-be-repaired area, and determining the number of repaired elements corresponding to the number of reference elements based on the area ratio; and
  generating pattern elements corresponding to the number of repaired elements in the to-be-repaired area in a random manner, and performing the regional color matching on the pattern elements based on the pattern types.

For example, in the embodiment, the server will determine pattern types that have no connection relationship with the to-be-repaired contour in the reference area, that is, pattern types that are far away from the to-be-repaired contour, and calculate the number of pattern elements of each pattern type in the reference area, that is, the number of reference elements. At this time, the server will obtain an area ratio between the reference area and the to-be-repaired area, and based on the area ratio, it can determine the number of pattern elements of each pattern type in the to-be-repaired area, that is, the number of repair elements. For example, the area ratio between the reference area and the to-be-repaired area is 1:1, which means that the number of repair elements in the to-be-repaired area is the same as that of reference elements in the reference area.

After determining the number of reference elements in the to-be-repaired area, the server will randomly generate pattern elements corresponding to the number of repair elements in the to-be-repaired area, and then perform regional color matching on the pattern elements according to colors of the pattern types. The embodiment can determine the number of repair elements in the to-be-repaired area based on the area ratio between the reference area and the to-be-repaired area. The number of repair elements calculated in this way is more accurate.

The step S112 further includes the following steps:
  obtaining a repaired image of the repaired marble, and generating historical record entries based on the repaired image and the to-be-repaired image.

For example, in the embodiment, after determining the repaired marble, the server will obtain a repaired image of the repaired marble, and generate historical record entries based on the repaired image and the to-be-repaired image for subsequent viewing by the administrator side.

Furthermore, the step of "obtaining a repaired image of the repaired marble, and generating historical record entries based on the repaired image and the to-be-repaired image" further includes the following steps:
  calling a historical repair form, where the historical repair form includes blank record entries arranged in order, and each of the blank record entries includes a time slot and an image slot;
  selecting one of the blank record entries in order, and determining the one as a to-be-filled record entry;
  calling a preset camera plug-in, and collecting images of the repaired marble based on the preset camera plug-in to obtain the repaired image of the repaired marble and a collection time; and
  filling the collection time into the time slot, and filling the repaired image and the to-be-repaired image into the image slot to obtain the historical record entries.

For example, in the embodiment, after controlling the machine side to complete the repair of the to-be-repaired area, the server will first call a historical repair form, where the historical repair form includes a plurality of blank record entries arranged in order, and each of the blank record entries includes a time slot and an image slot. The server will select one of the blank record entries in order, determine the one as a to-be-filled record entry, and call the preset camera plug-in to collect images of the repaired marble. After image collection, the repaired image of the repaired marble and the image collection time are obtained, the image collection time is filled into the time slot in turn, and the repaired image and the to-be-repaired image are filled into the image slot. After completing the corresponding filling, a historical record entry is obtained so that the administrator side can view the information related to the repaired marble in the future.

Furthermore, the step of filling the repaired image and the to-be-repaired image into the image slot further includes the following steps:
  including a preset blank image layer in the image slot, where the preset blank image layer includes a first image area and a second image area;
  filling the first image area with the repaired image, and generating in the first image area a first marking frame for selecting the repaired area in the repaired image;
  filling the second image area with the to-be-repaired image, and generating in the second image area a second marking frame for selecting the to-be-repaired area in the to-be-repaired image; and
  generating a marking frame connection line, where one end of the marking frame connection line is connected to an outline of the first marking frame and the other end thereof is connected to an outline of the second marking frame.

For example, in the embodiment, the server will fill relevant content into the image slot. There is a blank image layer set in advance in the image slot, namely the preset blank image layer, where the preset blank image layer includes two image areas, namely a first image area and a second image area. The server will fill the repaired image into the first image area, and select the repaired area in the repaired image in the first image area to generate a first marking frame; then, the server will fill the to-be-repaired image into the second image area, and select the to-be-repaired area in the to-be-repaired image in the second image area to generate a second marking frame. After generating the first marking frame and the second marking frame, the server will connect them with a connection line, namely generating a marking frame connection line, where one end of the marking frame connection line is connected to an outline of the first marking frame and the other end thereof is connected to an outline of the second marking frame. The embodiment can quickly locate the repaired area of the repaired marble when the administrator side views the image-related information of the repaired marble in the future, saving a certain amount of working time.

According to the solution of the present invention, a server can implement the following steps in order: obtain a to-be-repaired image of to-be-repaired marble and perform image recognition based on the to-be-repaired image to determine a to-be-repaired contour in the to-be-repaired image; extend outward a preset distance along the to-be-repaired contour in the to-be-repaired image to generate a reference contour surrounding the to-be-repaired contour, and determine an area between the reference contour and the to-be-repaired contour as a reference area; fill a base coating into a to-be-repaired area to form an initial base coat; determine a base pixel value based on a color ratio of the reference area, and perform base color matching on the initial base coat based on the base pixel value to obtain a current base coat; perform regional color matching on the current base coat based on pattern distribution of the reference area to obtain a repaired area, and determine the to-be-repaired marble as repaired marble; and obtain a repaired image of the repaired marble, and generate historical record entries based on the repaired image and the to-be-repaired image. The present invention can perform color matching on the base coat based on the color ratio of the reference area in an objective manner, thereby greatly improving the marble repair effect and efficiency.

Figure 3:
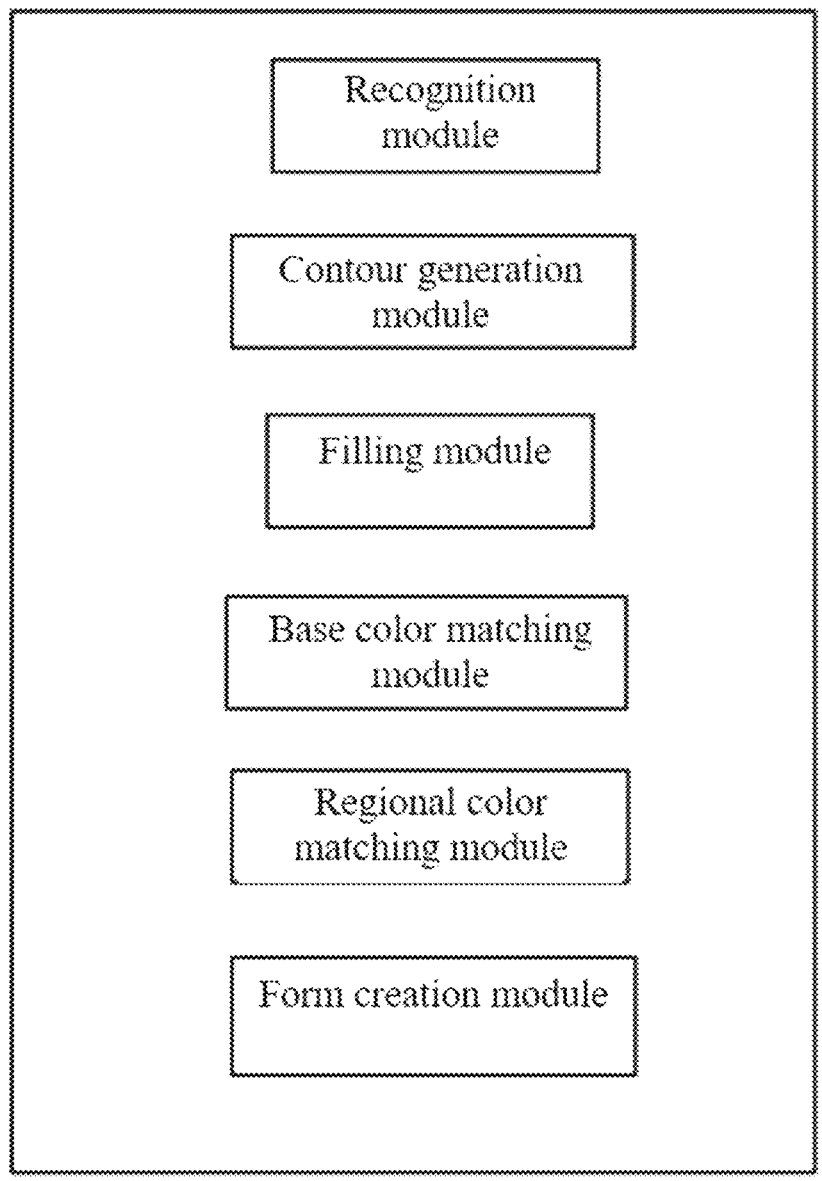
FIG. 3 is a structural block diagram of an automatic color matching configuration device for marble according to another embodiment of the present invention.

According to another embodiment of the present invention, an automatic color matching configuration device for marble is provided, as shown by the structural block diagram in FIG. 3, and the device includes:

- a recognition module, configured to obtain a to-be-repaired image of to-be-repaired marble, and perform image recognition based on the to-be-repaired image to determine a to-be-repaired contour in the to-be-repaired image;
- a contour generation module, configured to extend outward a preset distance along the to-be-repaired contour in the to-be-repaired image to generate a reference contour surrounding the to-be-repaired contour, and determine an area between the reference contour and the to-be-repaired contour as a reference area;
- a filling module, configured to fill a base coating into a to-be-repaired area in the to-be-repaired contour to form an initial base coat;
- a base color matching module, configured to determine a base pixel value based on a color ratio of the reference area, and perform base color matching on the initial base coat based on the base pixel value to obtain a current base coat;
- a regional color matching module, configured to perform regional color matching on the current base coat based on pattern distribution of the reference area to obtain a repaired area, and determine the to-be-repaired marble as repaired marble; and
- a form creation module, configured to obtain a repaired image of the repaired marble, and create a historical repair form based on the repaired image and the to-be-repaired image.

By way of example and not limitation, readable media may include readable storage media and communication media. Readable storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of readable media.

The algorithms and displays presented herein are not inherently related to any particular computer, virtual system, or other device. Various general purpose systems may be used with the examples of the present invention. From the above description, the structure required to construct such systems is obvious. Furthermore, the present invention is not intended to be limited to any particular programming language. It should be appreciated that a variety of programming languages may be used to implement the content of the present invention described herein, and the above description of a particular language is for the purpose of disclosing a preferred embodiment of the present invention.

In the specification provided herein, numerous specific details are set forth. However, it should be appreciated that the embodiment of the present invention may be practiced without these specific details. In some instances, well-known methods, structures, and techniques have not been shown in detail in order not to obscure an understanding of the specification.

Similarly, it should be appreciated that in the description of the exemplary embodiment of the present invention, various features of the present invention are sometimes grouped together in a single embodiment, figure, or description thereof for the purpose of streamlining the present disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of the present invention.

Those skilled in the art should appreciate that the modules or units or components of the device in the examples disclosed herein may be arranged in the device as described in the embodiment or, alternatively, may be located in one or more devices that are different from the device described in the examples. The modules in the foregoing examples may be combined into one module or further divided into multiple sub-modules.

Those skilled in the art will appreciate that the modules in the device of the embodiment may be adaptively changed and arranged in one or more devices different from the embodiment. The modules or units or components in the embodiment may be combined into one module or unit or component and, furthermore, they may be divided into multiple sub-modules or sub-units or sub-components. Any combination of all features disclosed in the specification (including any accompanying claims, abstract, and drawings), and all of the processes or units of any method or device so disclosed, may be used in combination, except insofar as at least some of such features and/or processes or units are mutually exclusive. Each feature disclosed in the specification (including any accompanying claims, abstract, and drawings) may be replaced with alternative features serving the same, equivalent, or similar purpose, unless expressly stated otherwise.

Furthermore, those skilled in the art will appreciate that while some embodiments herein include some features but not others included in other embodiments, combinations of features of different embodiments are meant to be within the scope of the present invention and form different embodiments. For example, in the following claims, any of the claimed embodiments can be used in any combination.

Furthermore, some of the described embodiments are described herein as methods or combinations of method elements that may be implemented by a processor of a computer system or by other devices for implementing the described functions. Therefore, a processor having the necessary instructions for implementing the methods or method elements forms a device for implementing the methods or method elements. Furthermore, elements of device embodiments described herein are examples of devices for implementing the functions executed by the elements for the purpose of implementing the present invention.

As used herein, unless otherwise specified, the use of the ordinal adjectives such as "first", "second", and "third" to describe a common object only indicates that different instances of similar objects are being referred to, and is not intended to imply that the objects so described must be in a given sequence, either temporally, spatially, in ranking, or in any other manner.

Although the present invention has been described according to a limited number of embodiments, those skilled in the art will appreciate that, benefiting from the above description, other embodiments may be contemplated within the scope of the present invention described herein. Furthermore, it should be noted that the language used herein has been selected primarily for readability and teaching purposes rather than for explaining or defining the subject matter of the present invention. Therefore, many modifications and changes will be apparent to those of ordinary skill in the art without departing from the scope and spirit of the appended claims. The disclosure of the present invention is illustrative rather than restrictive as to the scope of the present invention, which is defined by the appended claims.

What is claimed is:

1. An automatic color matching configuration method for marble, comprising the following steps:
    obtaining a to-be-repaired image of to-be-repaired marble, and performing image recognition based on the to-be-repaired image to determine a to-be-repaired contour in the to-be-repaired image;
    extending outward a preset distance along the to-be-repaired contour in the to-be-repaired image to generate a reference contour surrounding the to-be-repaired contour, and determining an area between the reference contour and the to-be-repaired contour as a reference area;
    filling a base coating into a to-be-repaired area in the to-be-repaired contour to form an initial base coat;
    determining a base pixel value based on a color ratio of the reference area, and performing base color matching on the initial base coat based on the base pixel value to obtain a current base coat;
    performing regional color matching on the current base coat based on pattern distribution of the reference area to obtain a repaired area, and determining the to-be-repaired marble as repaired marble; and
    obtaining a repaired image of the repaired marble, and generating historical record entries based on the repaired image and the to-be-repaired image.

2. The automatic color matching configuration method for marble of claim 1, wherein
    the step of obtaining a to-be-repaired image of to-be-repaired marble, and performing image recognition based on the to-be-repaired image to determine a to-be-repaired contour in the to-be-repaired image comprises:
    obtaining brightness of ambient light, and comparing the brightness with preset brightness;
    when the brightness is less than or equal to the preset brightness, calling a preset lighting plug-in, and illuminating the to-be-repaired marble based on the preset lighting plug-in;
    calling a preset camera plug-in, and collecting images of the to-be-repaired marble based on the preset camera plug-in to obtain the to-be-repaired image of the to-be-repaired marble; and
    inputting the to-be-repaired image to a pre-trained image recognition model to determine the to-be-repaired contour in the to-be-repaired image.

3. The automatic color matching configuration method for marble of claim 1, wherein
    the step of extending outward a preset distance along the to-be-repaired contour in the to-be-repaired image to generate a reference contour surrounding the to-be-repaired contour, and determining an area between the reference contour and the to-be-repaired contour as a reference area comprises:
    determining a circumscribed circle having a circumscribed relationship with the to-be-repaired contour, and determining a radius of the circumscribed circle as the preset distance;
    extending outward the preset distance along the to-be-repaired contour to generate an initial contour surrounding the to-be-repaired contour, and determining whether contour lines of the initial contour are wholly located inside a frame of the to-be-repaired image; and
    when the contour lines of the initial contour are at least partially located outside the to-be-repaired image, updating the initial contour based on the frame of the to-be-repaired image to obtain the reference contour located inside the frame, and determining the area between the reference contour and the to-be-repaired contour as the reference area.

4. The automatic color matching configuration method for marble of claim 3, wherein
    the step of updating the initial contour based on the frame of the to-be-repaired image to obtain the reference contour located inside the frame comprises:
    when the contour lines of the initial contour are wholly located outside the to-be-repaired image, determining the frame of the to-be-repaired image as the reference contour; or
    when the contour lines of the initial contour are partially located outside the to-be-repaired image, determining independent segments in the partial contour lines;
    obtaining a first intersection point and a second intersection point between each of the independent segments and the frame, and dividing the frame based on the first intersection point and the second intersection point to obtain updated segments corresponding to the independent segments; and
    updating the initial contour based on the updated segments corresponding to the independent segment to obtain the reference contour located inside the frame.

5. The automatic color matching configuration method for marble of claim 1,
    wherein the step of determining a base pixel value based on a color ratio of the reference area, and performing base color matching on the initial base coat based on the base pixel value to obtain a current base coat comprises:
    obtaining reference pixel points located inside the reference area, and determining reference pixel values corresponding to the reference pixel points;

calling a plurality of preset pixel value intervals, and dividing the reference pixel points corresponding to the reference pixel values within the same preset pixel value interval into the same group to obtain reference pixel groups;

calculating the number of pixels of the reference pixel points in the reference pixel groups to obtain calculated numbers corresponding to the reference pixel groups;

determining the one with the largest calculated number among the reference pixel groups, and determining the preset pixel value interval corresponding thereto as a base interval;

obtaining a maximum endpoint value and a minimum endpoint value in the base interval, and calculating a mean based on the maximum endpoint value and the minimum endpoint value to obtain the base pixel value; and performing the base color matching on the initial base coat based on the base pixel value to obtain the current base coat.

6. The automatic color matching configuration method for marble of claim 1, wherein the step of performing regional color matching on the current base coat based on pattern distribution of the reference area to obtain a repaired area comprises:

obtaining pattern types located inside the reference area, wherein different pattern types correspond to different pattern elements;

when at least two pattern elements of the same pattern type extend to connect with different positions of the to-be-repaired contour, extending the at least two pattern elements in a direction toward the to-be-repaired area respectively to form interconnected transition areas; and performing the regional color matching on the transition areas based on the pattern types to obtain the repaired area.

7. The automatic color matching configuration method for marble of claim 6, wherein the method further comprises:

determining pattern types far away from the to-be-repaired contour, and determining the number of reference elements of the pattern elements corresponding to the pattern types in the reference area;

obtaining an area ratio between the reference area and the to-be-repaired area, and determining the number of repaired elements corresponding to the number of reference elements based on the area ratio; and generating pattern elements corresponding to the number of repaired elements in the to-be-repaired area in a random manner, and performing the regional color matching on the pattern elements based on the pattern types.

8. The automatic color matching configuration method for marble of claim 1, wherein the step of obtaining a repaired image of the repaired marble, and generating historical record entries based on the repaired image and the to-be-repaired image comprises:

calling a historical repair form, wherein the historical repair form comprises blank record entries arranged in order, and each of the blank record entries comprises a time slot and an image slot;

selecting one of the blank record entries in order, and determining the one as a to-be-filled record entry;

calling a preset camera plug-in, and collecting images of the repaired marble based on the preset camera plug-in to obtain the repaired image of the repaired marble and a collection time; and filling the collection time into the time slot, and filling the repaired image and the to-be-repaired image into the image slot to obtain the historical record entries.

9. The automatic color matching configuration method for marble of claim 8, wherein the step of filling the repaired image and the to-be-repaired image into the image slot comprises:

comprising a preset blank image layer in the image slot, wherein the preset blank image layer comprises a first image area and a second image area;

filling the first image area with the repaired image, and generating in the first image area a first marking frame for selecting the repaired area in the repaired image;

filling the second image area with the to-be-repaired image, and generating in the second image area a second marking frame for selecting the to-be-repaired area in the to-be-repaired image; and generating a marking frame connection line, wherein one end of the marking frame connection line is connected to an outline of the first marking frame and the other end thereof is connected to an outline of the second marking frame.

10. An automatic color matching configuration device for marble, comprising:

a recognition module, configured to obtain a to-be-repaired image of to-be-repaired marble, and perform image recognition based on the to-be-repaired image to determine a to-be-repaired contour in the to-be-repaired image;

a contour generation module, configured to extend outward a preset distance along the to-be-repaired contour in the to-be-repaired image to generate a reference contour surrounding the to-be-repaired contour, and determine an area between the reference contour and the to-be-repaired contour as a reference area;

a filling module, configured to fill a base coating into a to-be-repaired area in the to-be-repaired contour to form an initial base coat;

a base color matching module, configured to determine a base pixel value based on a color ratio of the reference area, and perform base color matching on the initial base coat based on the base pixel value to obtain a current base coat;

a regional color matching module, configured to perform regional color matching on the current base coat based on pattern distribution of the reference area to obtain a repaired area, and determine the to-be-repaired marble as repaired marble; and a form creation module, configured to obtain a repaired image of the repaired marble, and create a historical repair form based on the repaired image and the to-be-repaired image.

* * * * *